Nov. 29, 1938.   E. C. HORTON   2,138,236
MOTOR VEHICLE
Filed Aug. 30, 1935   3 Sheets-Sheet 1

INVENTOR
Erwin C. Horton,
BY
Beau, Brooks, Buckley & Beau.
ATTORNEYS

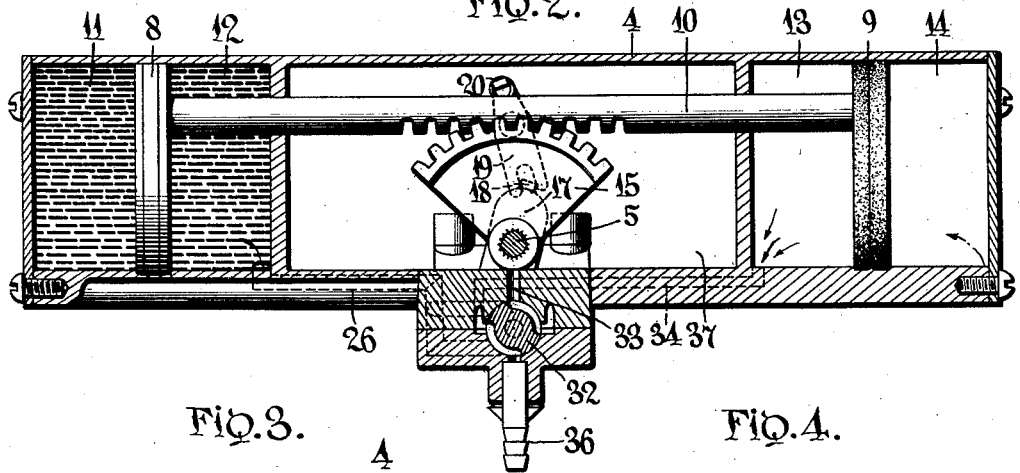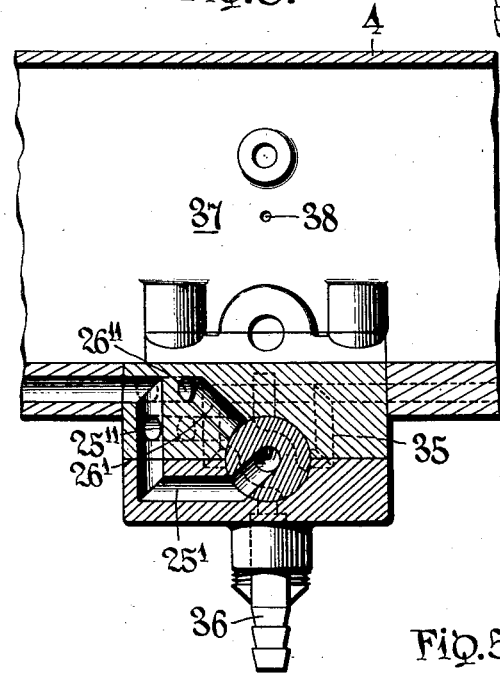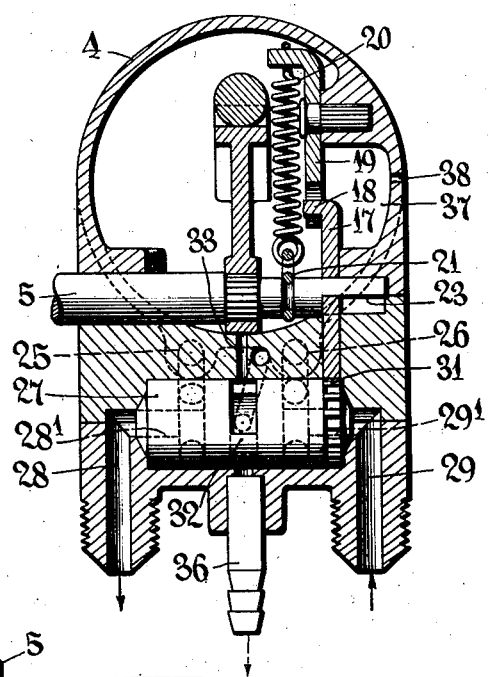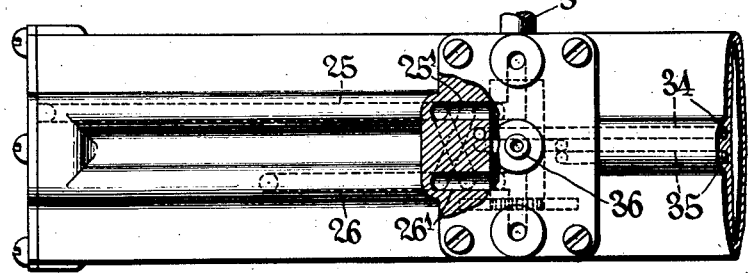

Nov. 29, 1938.  E. C. HORTON  2,138,236
MOTOR VEHICLE
Filed Aug. 30, 1935   3 Sheets-Sheet 3
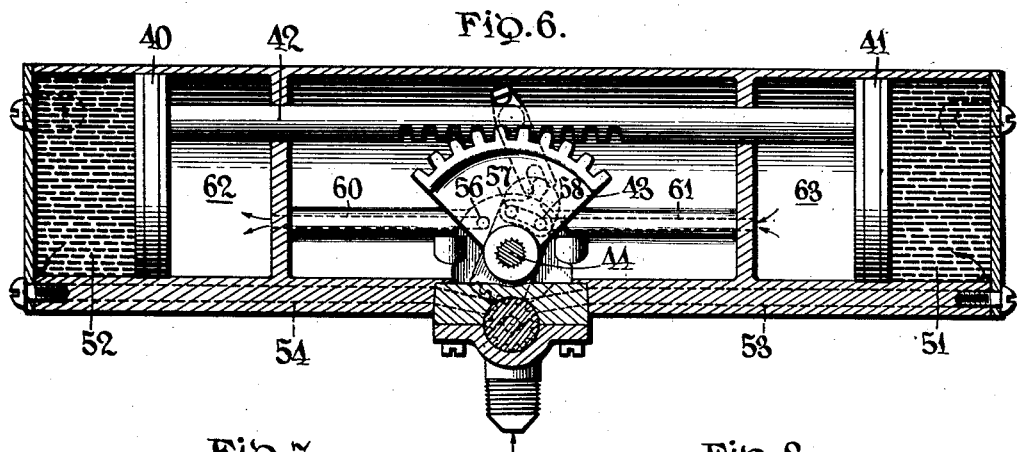
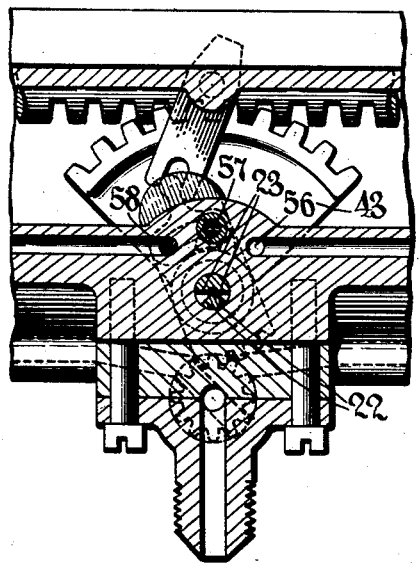
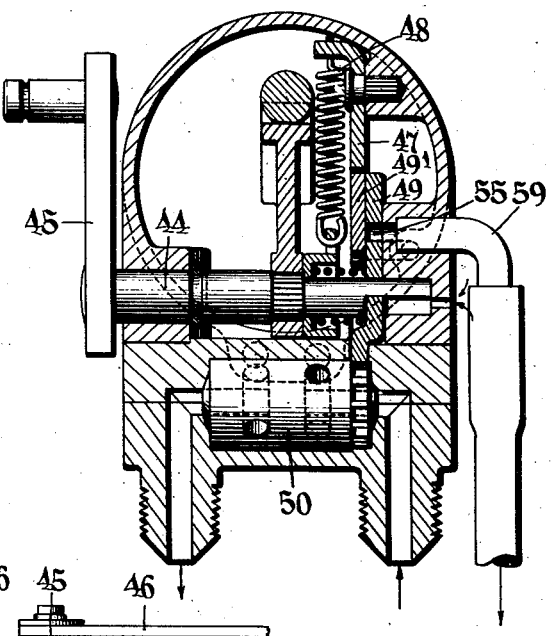
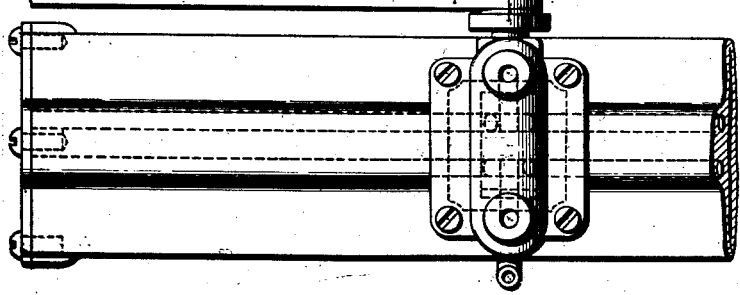
INVENTOR
Erwin C. Horton,
BY
Beau, Brooks, Buckley & Beau.
ATTORNEYS Patented Nov. 29, 1938

2,138,236

UNITED STATES PATENT OFFICE 2,138,236

MOTOR VEHICLE

Erwin C. Horton, Hamburg, N. Y., assignor to Trico Products Corporation, Buffalo, N. Y.

Application August 30, 1935, Serial No. 38,613

7 Claims. (Cl. 15—255)

This invention relates to motor vehicles and has particular reference to the operation of an accessory system thereof by fluid pressure influences derived from the vehicle engine.

Heretofore, it has been common practice to operate small motors, such as windshield cleaner motors, fuel pumping motors and the like, from the suction or low pressure influences in the intake manifold of the motor power plant. This suction influence is variable in its intensity and fluctuates according to the position of the engine throttle. Consequently, the operation of the suction motor is likewise variable in its operation.

The object of the present invention is to provide an accessory system which is operated from multiple sources of fluid pressure in the power plant and in a manner to compensate for wide irregularities in the supply of one pressure influence thereby to provide a steady and firm operation of the accessory system for greater efficiency throughout.

In the drawings

Fig. 2 is a longitudinal section through the accessory system motor;

Fig. 3 is an enlarged sectional view through the valve mechanism of the motor;

Fig. 4 is a transverse sectional view through the central portion of the motor;

Fig. 5 is a fragmentary plan view of the motor;

Fig. 6 is a longitudinal sectional view through a modified form of the motor;

Fig. 7 is an enlarged sectional view illustrating the valve mechanism thereof more clearly;

Fig. 8 is a cross sectional view through the modified motor; and

Fig. 9 is a fragmentary bottom plan view of the modified motor.

Figure 1:
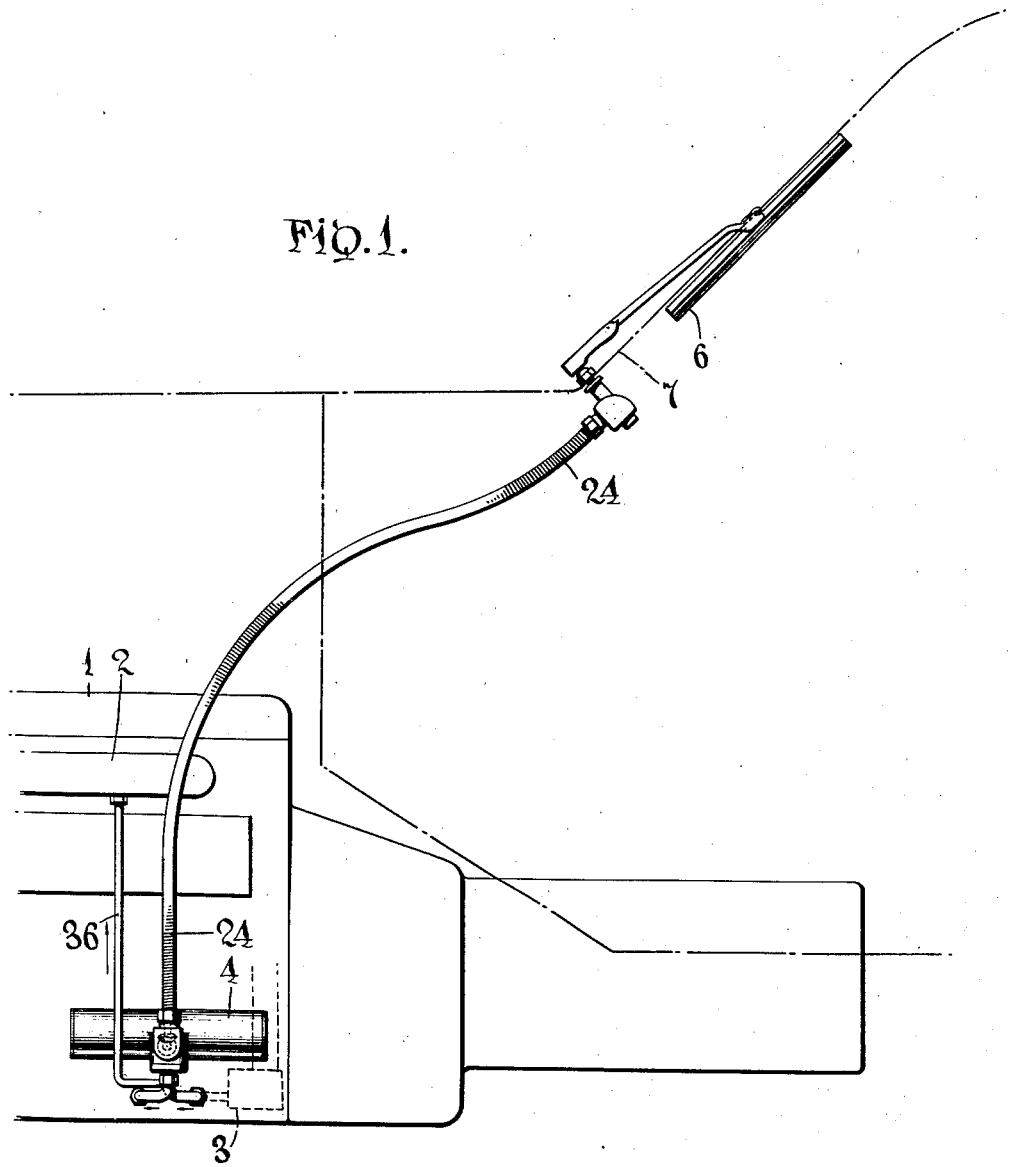
Fig. 1 is a view of a motor vehicle embodying the invention as applied to an accessory system thereof.

Referring more particularly to the drawings, the numeral 1 designates the motor vehicle power plant having the intake manifold 2 which is adapted to be used as one of the sources of pressure influence for the operation of the accessory system, the companion source being herein illustrated as the force feed lubricating system which embodies a pump, generally indicated at 3.

For the purposes of illustration the accessory system has been depicted as being of the windshield cleaner type, the same having a motor 4 provided with a wiper actuating shaft 5 which, in turn, is connected to the wiper 6 for reciprocating the latter over the windshield 7 of the vehicle. The motor 4 is adapted to be operated at a substantially constant speed by the cooperative action of the suction or low pressure influences from the intake manifold and the liquid pressure from the lubricating system.

To this end the motor embodies a piston having spaced parts 8 and 9 coupled by a bar 10. Each piston part is disposed in an individual compartment for operation and divides the same into two chambers (11, 12 and 13, 14). The bar 10 is connected to the wiper actuating shaft 5 and for this purpose may have rack teeth in meshing engagement with a segmental gear 15 on the shaft so that as the piston is reciprocated the actuating shaft will be oscillated to impart the desired movement to the wiper 6.

Oscillation of the shaft 5 is also utilized to operate a valve mechanism for effecting the operative application of the cooperation fluid pressures to the piston. Mounted on the shaft for limited play movement is a valve shifting lever 17 which has pivotal connection 18 to a kicker 19, the latter being normally held under the urge of a spring 20 which is anchored to a fixed point, as at 21. The valve shifting member 17 is provided with spaced shoulders 22 (Fig. 7) which are designed to be alternately engaged by cooperating shoulders 23 on the shaft after a limited movement of the latter, the resultant action being that after the piston has moved a predetermined distance, one pair of the shoulders 22, 23 will engage and cooperate to rock the lever 17, together with the kicker 19, from one side of the line of spring force to the opposite side thereof, or across a dead center position, whereby the spring 20 may act upon the kicker to accelerate the movement of the lever 17 over the shaft-imparted movement thereof in changing the position of the pressure directing valves, now to be described.

According to the disclosure in Fig. 2, chambers 11 and 12 are connected by passages 25 and 26 to the lubricating system through the inlet port 29 and the outlet port 28, the directive application of the oil pressure to the piston being accomplished by a valve 27. Each passage has branch passages (25', 25" and 26', 26") for alternate communication with the ports, as the valve is rocked back and forth, to present its ducts 28' and 29' thereto. The valve is oscillated by the lever 17, through the intermeshing teeth 31, to open the chamber 11 first to the pressure side of the lubricating system and concurrently with the opening of the chamber 12 to the crank case or the inlet side of the lubricating system, and then, upon a change of valve position, to reverse these connections, whereby pressure will be applied to the piston part 8 first in one direction and then in the opposite direction to impart the desired reciprocatory motion to the wiper.

As depicted in Fig. 1, the window cleaner motor may be disposed adjacent the engine crank case so that the oil will maintain its fluidity, a flexible shaft 24 being provided to transmit the driving power up to the cowl mounted wiper.

Chambers 13 and 14 are adapted to be alternately connected to the source of suction by a valve part 32 which, according to the present disclosure, is operable simultaneously with the valve 27, the unconnected chamber being opened to the atmosphere through an atmospheric passage 33. Chamber 13 is connected to the valve seat by passage 34 while chamber 14 is connected thereto by passage 35. The manifold connection is indicated at 36.

In the operation of the motor the automatic valve mechanism coordinates the pressure applications in a cooperative manner. For instance, in Fig. 2 chambers 12 and 13 are connected respectively to their sources of pressure, the pressure in chamber 12 pushing on its piston while the low pressure in chamber 13 is pulling on its piston. Upon a reversal of the valve, positive pressure will act in chamber 11 while negative or low pressure will act in chamber 14, chamber 13 being open to the atmosphere through passage 33. This passage opens into the chamber 37 which contains the valve snap mechanism embodying spring 20 and is in communication with the outside atmosphere as through a port 38.

In the modified form of the invention illustrated in Fig. 6, the piston parts 40 and 41 are coupled by a rack bar 42 having meshing engagement with segmental gear 43. This gear is fixed on the wiper actuating shaft 44 which carries on its outer end a crank arm 45 adapted to be connected by links 46 to a pair of wipers where it is desired to enlarge the window area being cleaned. The valve kicker 47 is acted upon by a spring 48 and interconnects with an offsetting plate 49' integral with the lever 49 for imparting oscillatory movement to the valve 50. The two liquid chambers 51 and 52 are connected respectively to the valve 50 by the passages 53 and 54.

In this particular form of the invention the valve 50 functions solely with respect to the liquid pressure from the oil system, a separate valve being utilized for the suction connections. This suction valve may be in the form of a recess 55, in a face of the lever 49, for bridging two of the three ports 56, 57 and 58, the port 57 being connected to the intake manifold as by conduit 59, while the remaining two ports are connected respectively by passages 60 and 61 to the suction chambers 62 and 63.

In operation of the modified embodiment the cooperating pressures act upon the same piston part. For instance, in Fig. 6 piston part 41 is being pulled upon by the low pressure in chamber 63, while liquid under a pressure above atmospheric is being delivered to the chamber 51 for pushing upon said piston part. The opposite piston part is expelling liquid from the chamber 52 back to the crank case or the inlet side of the oil pump while the chamber 62 is opened to the atmosphere.

In both forms of the invention the accessory motor is positively acted upon by the fluid from a pressure system of the motor vehicle power plant and concurrently therewith by the low pressure influence from the intake manifold, the two pressures cooperating to provide a steady and adequate supply of power for the operation of the accessory system. The power supplied is constant and uniform since during the intervals of low suction influence from the intake manifold as when the engine throttle is opened, the power plant is being operated at a greater speed and likewise the oil pump of the lubricating system to thereby insure an ample supply of liquid at a maximum pressure for the operation of the accessory motor. The two pressures vary independently and may vary inversely and thereby efficiently coact to provide a steady and constant operation of the accessory motor and the connected wiper.

Ordinarily when the vehicle engine is idling there is an overabundance of low pressure or suction influence maintaining in the intake manifold because the engine throttle is closed and, therefore, the windshield wiper motor or other accessory tends to race or operate at a very high speed, which not only produces unnecessary wear and tear on the windshield cleaner parts, but is a source of annoyance to the motorist. However, with the present invention this racing tendency is dampened to a practical extent by the retarding influence of the oil which is at its minimum or lowest pressure. Consequently the oil serves to govern or maintain the wiper against excessive speed under suction operation, as well as provide a practical speed of operation for the wiper in the absence of the suction influence from the intake manifold.

The foregoing description is merely illustrative of the present inventive principles involved which may be applied to other physical embodiments without departing from the scope and spirit of the invention claimed.

I claim:

1. In combination with a motor vehicle power plant having a force feed lubricating system and an intake manifold, a window wiper, a motor for operating the wiper, said motor having a part operable by the fluid pressure differential between the manifold suction influence and the oil pressure, and means connecting the intake manifold and lubricating system to the motor for the coopertive application to said part of the low and high pressure influences therefrom in the operation of the motor, whereby when the manifold influence drops during engine acceleration, the oil pressure will maintain the efficient operation of the wiper motor.

2. In combination with a motor vehicle power plant having a force feed lubricating system and a source of low pressure influence, wherein the pressure influences may vary inversely with respect to each other, a window wiper, and a motor actuating the wiper, said motor having piston means acted upon cooperatively by the two pressure influences to provide an actuating pressure differential, the oil pressure acting to govern the speed of operation of the wiper motor.

3. A window cleaner comprising, in combination with a motor vehicle power plant having a force feed lubricating system and a source of low pressure influence such as the intake manifold, wherein the pressure influences vary indirectly from each other, a wiper, a motor for actuating the wiper, said motor having piston means acted upon cooperatively by the two pressure influences with the oil pressure acting to dampen the acceleration of the wiper motor by the low pressure influence, and valve mechanism embodied in the motor and operative to reverse the application of such cooperating pressure influences to the piston means.

4. A motor vehicle power plant having a force feed liquid circulating system and a source of suction, an accessory motor having a piston composed of a pair of coupled parts, a compartment for each piston part divided thereby into chambers, passages connecting two opposed chambers to the system, valve means interposed in the passages for operatively applying the liquid pressure from the system to the piston first in one direction and then in the reverse direction for operating the motor, a second valve means operatively positioned to connect the other two opposed chambers alternately to the source of suction and to the atmosphere, and means operable by and during operation of the motor for actuating both valve means to harmonize the application of the positive liquid pressure and the negative fluid pressure to the piston cooperatively.

5. A motor vehicle having an internal combustion engine with a force feed lubricating system, a window wiper, a motor for actuating the wiper, said motor being mounted on the engine to derive heat therefrom for maintaining a substantially constant fluidity of the oil, a flexible shaft extending from the motor to the wiper to connect the two, said motor being connected by passages to the lubricating system and the engine intake manifold and operated by the fluid pressure differential.

6. A motor vehicle having an internal combustion engine with a force feed lubricating system, a window wiper, a motor for actuating the wiper and mounted on the engine so as to derive heat therefrom, a flexible shaft extending from the motor up to the wiper to connect the two, said motor being connected by passages to the lubricating system and the engine intake manifold and operated jointly and simultaneously by the fluid pressure influences thereof with the motor being dampened by the oil in its operation by the low pressure influence from the manifold.

7. In combination with a motor vehicle power plant having a force feed lubricating system and a source of gaseous pressure influence, a window wiper, and a motor operatively connected to the wiper for actuating the same, said motor having wet and dry pressure chambers connected respectively to the lubricating system and the source of gaseous pressure influence with piston means in said chambers acted upon by the two pressure influences, and means for cooperatively applying the two pressure influences concurrently to operate the motor.

ERWIN C. HORTON.